(12) United States Patent
Kozaki et al.

(10) Patent No.: US 8,182,084 B2
(45) Date of Patent: May 22, 2012

(54) DISPLAY UNIT

(75) Inventors: Tetsuo Kozaki, Okazaki (JP); Yuji Kato, Okazaki (JP); Eiji Suzuki, Okazaki (JP)

(73) Assignee: Tokai Optical Co., Ltd., Aichi (JP)

( * ) Notice: Subject to any disclaimer, the term of this patent is extended or adjusted under 35 U.S.C. 154(b) by 64 days.

(21) Appl. No.: 12/802,100

(22) Filed: May 27, 2010

(65) Prior Publication Data

US 2011/0292333 A1   Dec. 1, 2011

(51) Int. Cl.
*G02C 7/10* (2006.01)
(52) U.S. Cl. ........... 351/44; 351/158; 351/163; 359/630
(58) Field of Classification Search .................... 351/44, 351/158, 163; 359/629, 630
See application file for complete search history.

(56) References Cited

U.S. PATENT DOCUMENTS 6,816,314 B2 * 11/2004 Shimizu et al. ............... 359/630
2009/0180194 A1 * 7/2009 Yamaguchi et al. ........... 359/630

FOREIGN PATENT DOCUMENTS

| JP | 06-087920 | 12/1994 |
| JP | 2001-281594 | 10/2001 |
| JP | 2006-085011 | 3/2006 |
| JP | 2006-098827 | 4/2006 |
| JP | 2008-176096 | 7/2008 |

* cited by examiner

*Primary Examiner* — Huy K Mai
(74) *Attorney, Agent, or Firm* — Martine Penilla Group, LLP (57) ABSTRACT

A display unit includes an image data output device, an image projecting device that projects image data so as to be perceived by eyes of a user, a skeleton frame on which the image projecting device is mounted, the sunglass lenses being disposed on the skeleton frame, in which the sunglass lenses are set so that a transmissivity of visible light in a predetermined wavelength region is peculiarly low and so that transmissivities of visible light in wavelength regions other than the visible light in the predetermined wavelength region are peculiarly high, and in which the coloring of image light visualized by the image projecting device is formed by light differing in color from the visible light having peculiarly high transmissivities in the sunglass lenses.

12 Claims, 8 Drawing Sheets

DISPLAY UNIT

TECHNICAL FIELD

This invention relates to a display unit in which images taken by a camera or photographs or video images based on external data are displayed before the eyes of a person by a display device.

BACKGROUND ART

Conventionally, a technique has been developed for displaying images taken by, for example, a camera or a sequence of photographs, such as a motion picture, based on external data in real time directly in the neighborhood of eyeballs of a user or directly on a retina thereof.

For example, Japanese Published Unexamined Patent Application No. 2006-85011 or Japanese Published Unexamined Patent Application No. 2006-98827 can be mentioned as an example of a display device that adopts holography. Additionally, a retina scanning display device that displays images directly on a retina of a user can also be used as another transmissive display device.

As an example in which these display devices are adapted, it is conceivable to use these devices for low-vision or visually-impaired persons. In detail, the scenery around (especially, in front of) a visually-impaired person who is a user is imaged by a camera, and is displayed before the eyes of the user by a display device so as to be used as visual assistance. Generally, in a low-vision or visually-impaired person who has residual vision, it is bad to give great light energy to the retina of the person, and therefore external light is prevented from entering the eyes of the person by wearing lenses having a light blocking effect (hereinafter, referred to as "sunglass lenses").

Figure 9:
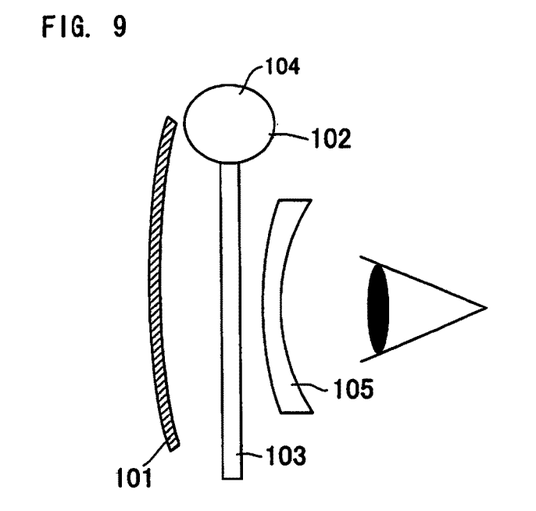
FIG. 9 is a schematic view of a transmissive display device in which sunglass lenses are disposed on the outermost side.
Figure 10:
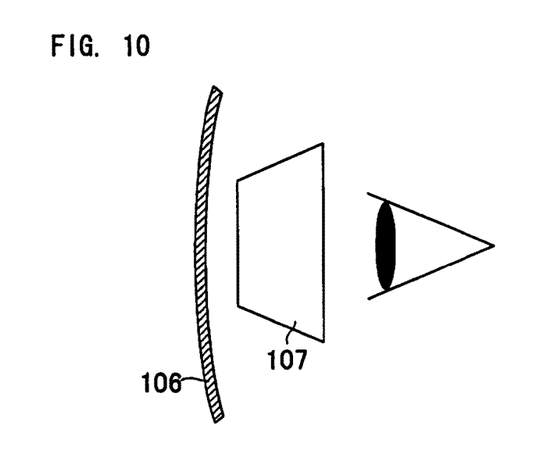
FIG. 10 is a schematic view of a non-transmissive display device in which sunglass lenses are disposed on the outermost side.

For example, the structure of FIG. 9 or that of FIG. 10 is conceived as a display unit for visual assistance in which sunglass lenses are used together.

FIG. 9 is a view showing an example of a display unit using a transmissive display device that adopts holography. A sunglass lens 101 is disposed on the outermost side (i.e., on the object side) of this display unit, and a transmissive display device 102 is disposed inside the sunglass lens 101. A corrective lens 105 is disposed inside the transmissive display device 102 (i.e., disposed closer to the eyeball). The transmissive display device 102 includes a transparent board and an image projecting part 104 disposed on the upper part of the board. In the transmissive display device 102, both a real image that has passed through the transparent board 103 and a virtual image of a hologram can be viewed in an overlapped state, and therefore this device is called "transmissive."

FIG. 10 is a view showing an example of a display unit using a non-transmissive display device. A sunglass lens 106 is disposed on the outermost side of this display unit, and a monitor 107 of a non-transmissive display device is disposed inside the sunglass lens 106. Unlike the transmissive display device, the non-transmissive display device allows a real image to be viewed only around the monitor 107.

Figure 11:
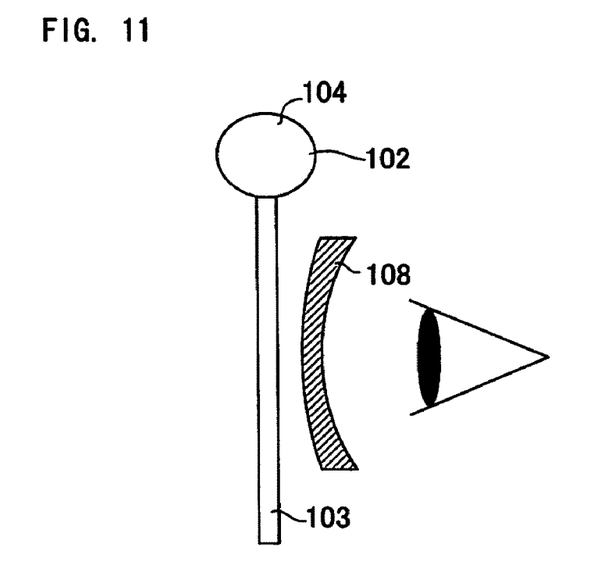
FIG. 11 is a schematic view of a transmissive display device in which sunglass lenses and a corrective lens are united together.

However, in the display unit of FIG. 9, three lenses are overlapped together in the front-back direction, thus leading to a complex structure and an inferior outward appearance. Therefore, it is preferable to unite the sunglass lens 101 and the lens 105 together and dispose the lens 108 having a sunglass function on the eyeball side of the transmissive display device 102 in the same way as in the display unit of FIG. 11.

Figure 12:
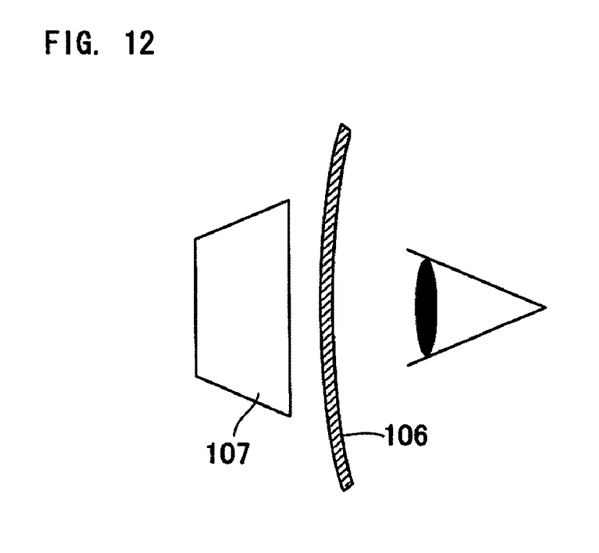
FIG. 12 is a schematic view of a non-transmissive display device in which sunglass lenses are disposed on the innermost side.

Generally, the non-transmissive display device of the display unit of FIG. 10 has a function to allow the device itself to adjust visibility, and therefore another lens is not required. However, if the monitor 107 is thick, problems will be caused in the fact that its thickness makes it difficult to intercept external light and in the fact that the lenses-wearing person has an uncomfortable feeling because the sunglass lens 106 used as a component is kept greatly away from the eyes forwardly. Therefore, it is preferable to dispose the sunglass lens 106 closer to the eyeball than the monitor 107 as shown in FIG. 12.

Figure 13:
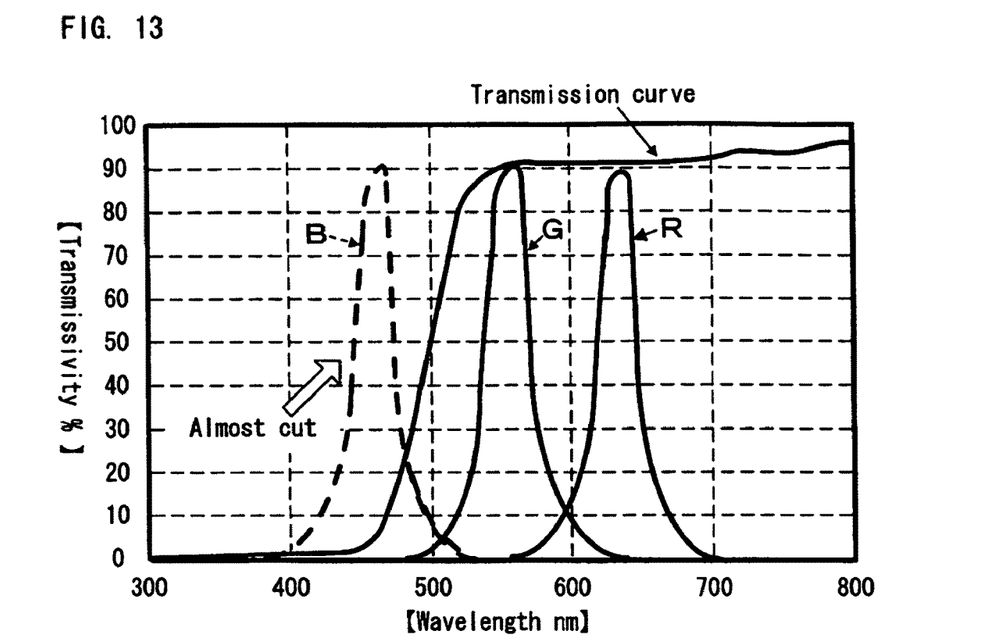
FIG. 13 is a graph showing a relationship between transmission characteristics of sunglass lenses and image light passing through a display device.

However, there are many cases in which the characteristic of blocking light on the short wavelength side having great energy, more specifically, the characteristic of blocking light on the ultraviolet side from near blue is normally given to the sunglass lenses 101 and 106 as shown in a transmission characteristic graph of FIG. 13. In other words, visible light that is external light is viewed as yellowish light while allowing light excluding blue light to remain. However, a color image is reproduced by combining light's three primary colors R, G, and B together, and therefore, if a structure in which the sunglass lenses are disposed closer to the eyeball than the display device is adopted as in FIG. 11 or FIG. 12, B light will likewise be almost cut from light of images displayed on the display device as shown in the graph of FIG. 13, and, as a result, the color image loses blue, and becomes yellowish as a whole. On the other hand, in the sunglass lenses, light on the blue side is originally cut, and therefore there is no difference in color (i.e., hue) after all, and the scenery becomes yellowish as a whole before the eyes of the user, and, as a result, the real image and the virtual image must be distinguished from each other only by the difference in brightness. Therefore, it becomes difficult to draw a distinction between the real image and the virtual image.

On the other hand, in an example in which the sunglass lenses 101 and 106 are disposed on the more external side than the display device (i.e., on the object side) as in FIG. 9 and FIG. 10, when the scenery is viewed at nighttime, there is a case in which it is difficult to draw a distinction between a virtual image of a hologram and a real image that has passed through the sunglass lenses 101 and 106 and that has been overlapped with the virtual image, because the scenery is dark, and saturation is low.

The foregoing description is given as a noticeable problem occurring in a visually-impaired person when the display unit is structured such that the sunglass lenses are used in combination with the display device. However, even if the person is not a visually-impaired person, the same problem will arise in the display unit in which the sunglass lenses are used in combination with the display device.

Therefore, a technique capable of easily drawing a distinction between a real image and a photographic image has been required regardless of a positional relationship between sunglass lenses and a display device.

The present invention has been made in consideration of the problems existing in the conventional technique, and it is an object of the present invention to provide a display unit that enables a user to easily distinguish a real image and a photographic image from each other regardless of a positional relationship between sunglass lenses and a display device.

DISCLOSURE OF INVENTION

To solve the above-mentioned problems, a display unit according to the present invention comprises an image data output device, an image projecting device that visualizes image data output from the image data output device and then projects the image data so as to be perceived by eyes of a user, a skeleton frame on which the image projecting device is mounted and that is set so that a nasal dorsum of the user and auricle bases of the user serve as parts that support the skeleton frame and sunglass lenses that have a predetermined transmission characteristic, the sunglass lenses being disposed directly or indirectly on the skeleton frame and being disposed in front of eyeballs of the user, respectively, in which the sunglass lenses are set so that a transmissivity of visible light in a predetermined wavelength region is peculiarly low and so that transmissivities of visible light in wavelength regions other than the visible light in the predetermined wavelength region are peculiarly high, and in which the coloring of image light visualized by the image projecting device is formed by light differing in color from the visible light having peculiarly high transmissivities in the sunglass lenses.

Additionally, a display unit according to the present invention comprises an image pickup device, an image projecting device that visualizes image data output from the image pickup device and then projects a visualized image onto eyes of a user so as to be perceived by the user, a skeleton frame on which the image projecting device is mounted and that is set so that a nasal dorsum of the user and auricle bases of the user serve as parts that support the skeleton frame, and sunglass lenses that have a predetermined transmission characteristic, the sunglass lenses being disposed directly or indirectly on the skeleton frame and being disposed in front of eyeballs of the user, respectively; in which the sunglass lenses are set so that a transmissivity of visible light in a predetermined wavelength region is peculiarly low and so that transmissivities of visible light in wavelength regions other than the visible light in the predetermined wavelength region are peculiarly high, and in which the coloring of image light visualized by the image projecting device is formed by light differing in color from the visible light having peculiarly high transmissivities in the sunglass lenses.

In the thus formed structure, the image projecting device allows the eyes of a user to perceive an image visualized based on image data output from the image data output device. At this time, image light has a hue differing from that of a real image formed by external light that passes through the sunglass lenses and then reaches the eyeballs of the user, in other words, the color of image light and the color of a real image are different from each other, and therefore a clear distinction can be drawn between a photographic image and a real image, and the user can recognize the visualized image as an image differing from the real image without confusing the two images. For example, if only blue of visible light is cut in a lens (i.e., a sunglass lens), external light that passes through the lens will become yellow by light in remaining wavelength regions. In this case, colors other than yellow can be used as the color of photographic image light.

The definition "the sunglass lenses are set so that a transmissivity of visible light in a predetermined wavelength region is peculiarly low" is not necessarily limited to the fact that 100% of the visible light in the predetermined wavelength region is cut. In other words, what is required is the fact that visible light in a predetermined wavelength region to be intended to be roughly cut is satisfactorily controlled by a sunglass function. Additionally, it is permissible to peculiarly set the transmissivity to be low in regions including an ultraviolet region and a near-infrared region other than visible light. Additionally, either the reflecting action of light or the absorbing action of light (or, alternatively, both thereof) may be used when light passing through the lens is cut. The term "visible light in a predetermined wavelength region" denotes visible light having a predetermined continuous width. The definition "the sunglass lenses are set so that transmissivities of visible light in wavelength regions other than the visible light in the predetermined wavelength region are peculiarly high" specifies a relative transmissivity with respect to the fact that a transmissivity of visible light in a predetermined wavelength region is peculiarly low, and does not necessarily specify a 100% transmissivity.

In order to give a predetermined transmission characteristic to a sunglass lens, it is generally performed to use, for example, colored glass that contains pigments showing an absorptive characteristic and a transmissive characteristic with respect to a predetermined wavelength region. However, for example, an interference filter may also be used to reflect light having a specific wavelength. The interference filter is a filter that selects only light having a specific wavelength from an optical spectrum, and is a multilayer structure formed by piling arbitrary dielectric thin films or arbitrary metallic thin films in an arbitrary order so as to give a desired transmission characteristic thereto. Additionally, the sunglass lens may be used also as a lens. This lens is not necessarily required to be designed so that a correction degree is set for near-sightedness or astigmatism.

Examples of the image projecting device include a transmissive display device that has an image projection monitor displaying an image supplied from the image data output device, more specifically, a transmissive display device that has a transparent board that visualizes data based on, for example, image data output from the image data output device and then guides the resulting image light to a reflection light element and a non-transmissive display device that has an image projection monitor displaying an image supplied from the image data output device. The term "reflection light element" mentioned here denotes, in the transparent board, an element that has a surface intersecting with a line extending in a direction in which the eyes of the user are looking, and an element that has a surface through which external light passes and onto which image light reflected and guided in the transparent board is projected. Examples of the reflection light element include a hologram element and a half mirror. Additionally, a retina scanning display in which a retina of the user is directly two-dimensionally scanned with coherent visible light, such as laser light, so as to recognize the visible light as an image without using the reflection light element can be used as a non-transmissive display device.

In the transmissive display device provided with the transparent board, the sunglass lens may be disposed before the transparent board (i.e., on the object side) or behind the transparent board (i.e., on the eyeball side). The reason is that a photographic image (i.e., virtual image) and a real image are mingled with each other even if any positional relationships are formed between the sunglass lens and the transparent board, and therefore the two images must be viewed with rays of light having mutually different wavelengths. On the other hand, in the non-transmissive display device provided with the image projection monitor, the present invention is required to be applied when the sunglass lens is disposed behind the monitor.

The image data output device may be an image pickup device. In other words, as a generic concept, this denotes that a case in which image data excluding the image data obtained by actually performing photography is viewed is included.

Although a color image is composed of the three primary colors RGB, the use of only one of these three colors makes it possible to produce a hue that can be easily distinguished from a real image. In particular, the maximum sensitive wavelength of humans is about 560 nm in a bright scene, and is about 500 nm in a dark scene, and hence resides in a wavelength region corresponding exactly to green. Therefore, images can be more easily recognized by using green as an image color.

Preferably, the image light is obtained by projecting an image taken by the image pickup device while using light of any one of the three primary colors RGB.

Other aspects and advantages of the present invention will become apparent from the following description, taken in conjunction with the accompanying drawings, illustrating by way of example the principles of the invention.

DETAILED DESCRIPTION OF THE INVENTION

A display unit according to an embodiment of the present invention will be hereinafter described with reference to the drawings.

Figure 1:
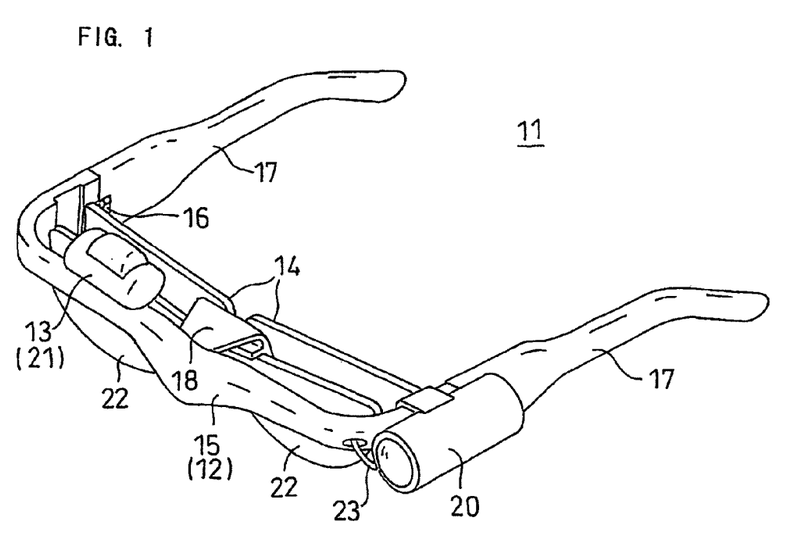
FIG. 1 is a perspective view of a display unit for visual assistance according to an embodiment of the present invention.
Figure 2:
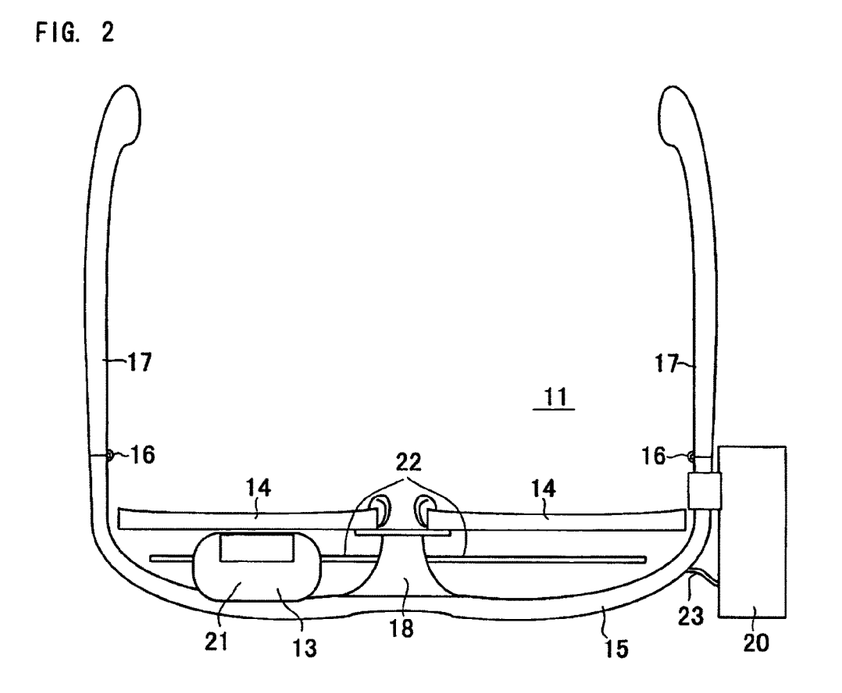
FIG. 2 is a plan view of the display unit for visual assistance same as FIG. 1.

As shown in FIG. 1 and FIG. 2, the display unit for visual assistance (hereinafter, referred to simply as "display unit") 11 is composed of a transmissive display device 13 mounted on a skeleton frame 12 and corrective lenses 14. The skeleton frame 12 is composed of a main frame 15 and a pair of temples 17 connected to both ends of the main frame by means of hinges 16, respectively. A bracket 18 is attached to an inner surface of the center of the main frame 15.

The transmissive display device 13 is composed of a camera 20 serving as an image pickup device, an image projecting part 21, and a transparent board 22 serving as an image projection monitor. In this embodiment, the camera 20 is detachably attached to a part near the left end of the main frame 15. Although the image projecting part 21 is attached to the right upper end of the transparent board 22 in this embodiment, the image projecting part 21 may be attached to the left upper end of the transparent board 22 or to the right and left upper ends of the transparent board 22. The camera 20 and the image projecting part 21 are connected together by means of a cable 23. A power source for the camera 20 and the image projecting part 21 is not shown in the figures in this embodiment.

Figure 3:
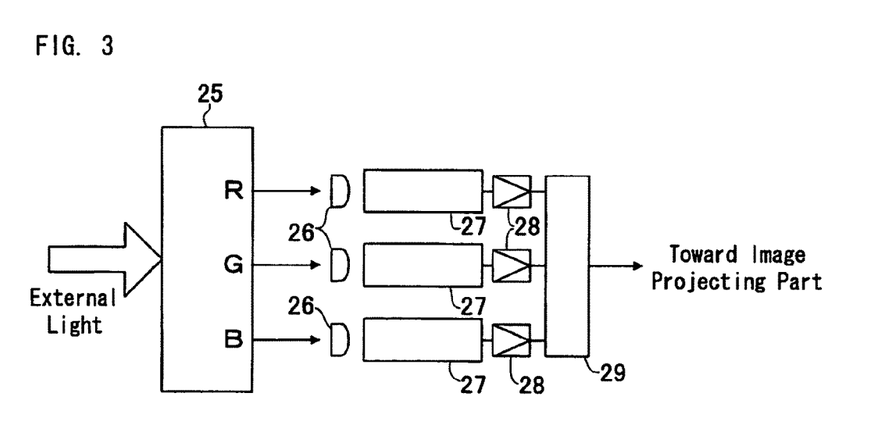
FIG. 3 is a block diagram for explaining an optical system and an electric structure of a camera.

As shown in FIG. 3, an optical system of the camera 20 according to this embodiment includes an RGB division optical circuit 25 composed of a beam splitter and a prism, three condensing lenses 26 disposed in accordance with each of the RGB lights behind the RGB division optical circuit 25, and image pickup tubes 27. The image pickup tubes 27 are connected to amplifiers 28 and to a control circuit 29 respectively. A photographic image is divided into three primary colors RGB in the RGB division optical circuit 25, and the resulting colors are guided to the image pickup tubes 27, and are converted into signals, respectively. Each of the RGB images converted into signals by the image pickup tubes 27 is processed by the amplifier 28 and the control circuit 29, and is output to the image projecting part 21 according to a predetermined signal system.

Figure 4:
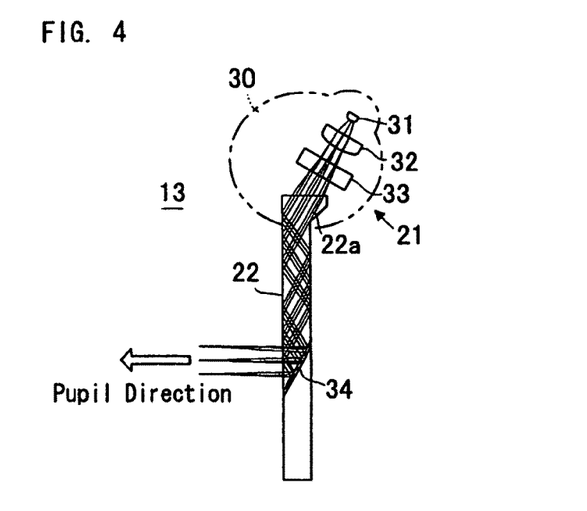
FIG. 4 is an explanatory view for explaining an optical structure of an image projecting part.

As shown in FIG. 4, the image projecting part 21 according to this embodiment is composed of a light emitting diode (LED) 31 contained in a housing 30, a condensing lens 32, and a liquid crystal display (LCD) 33. In this embodiment, the LED 31 is a green light emitting diode that emits wholly green light. Therefore, image data divided into three primary colors RGB is projected in a green color. Image data output from the camera 20 through the cable 23 is projected from the LED 31 onto the condensing lens 32 in the image projecting part 21, is then modulated by the LCD 33, and is admitted into the transparent board 22 through a corrective prism 22a disposed on the upper part of the transparent board 22 in the form of an image beam of light. The transparent board 22 totally reflects the image beam of light while serving as a total reflection prism. The image beam of light is guided to the hologram element 34 disposed in the transparent board 22 while being reflected therein, is then diffracted, and is admitted into the pupil. As a result, a user can view a virtual image of a scene displayed on the LCD 33.

Figure 5:
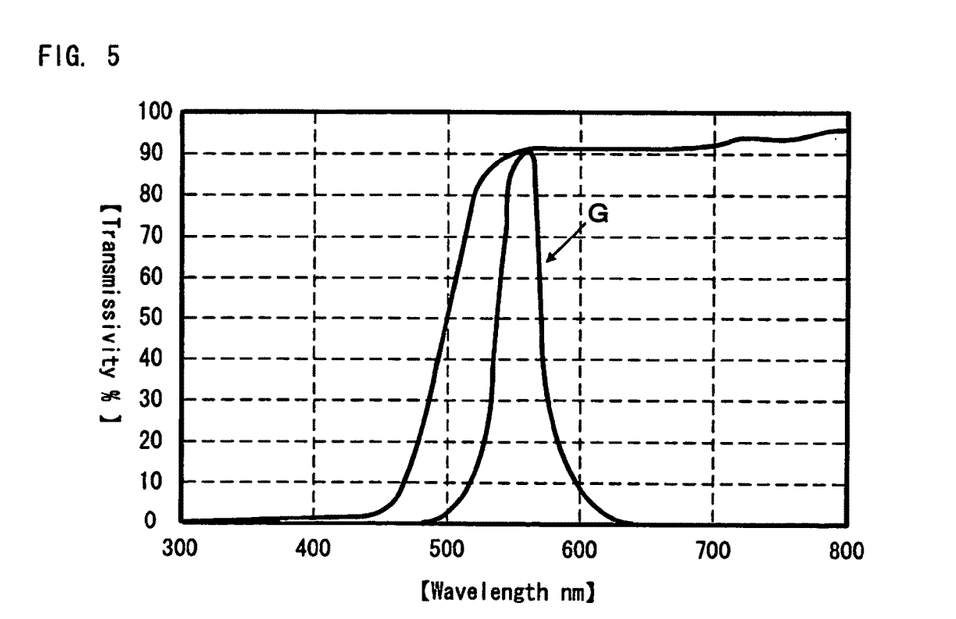
FIG. 5 is a graph showing transmission characteristics of a lens in a state of being overlapped with G light of a hologram element.

FIG. 5 is a graph showing transmission characteristics of the lens 14 according to this embodiment in a state of being overlapped with G light of the hologram element 34. In this embodiment, light in a wavelength region below 450 nm is cut, and the lens 14 is used also as a sunglass lens. Therefore, the lens 14 cuts blue-based light of visible light that is external light, and therefore a real image viewed by passing through the lens 14 has a yellowish hue (tone).

Figure 6:
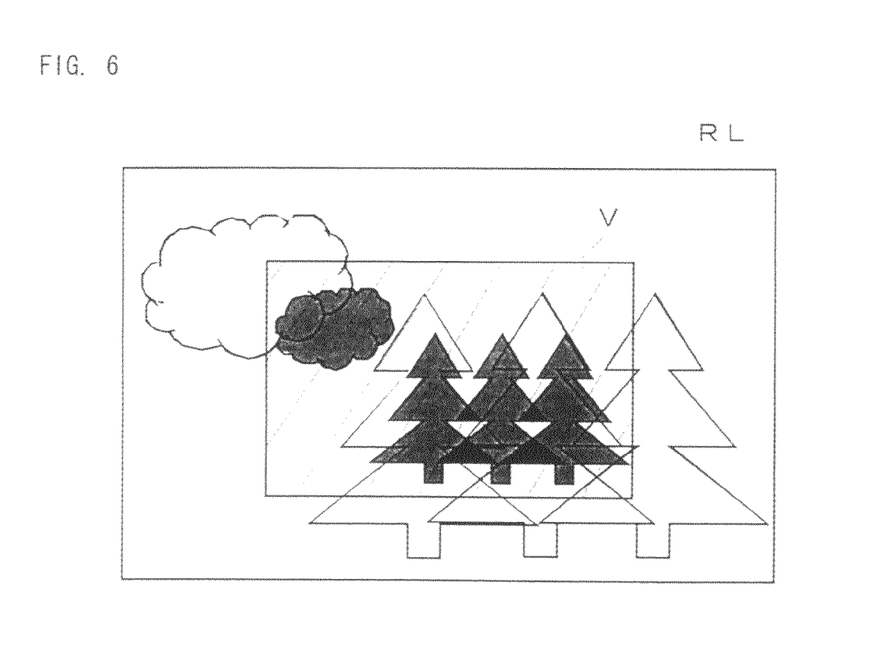
FIG. 6 is an explanatory view schematically showing an example of scenery viewed by a user.

On the other hand, as described above, a virtual image by means of G light is displayed on the hologram element 34 of the transparent board 22. In the field of view of the user, a green virtual image V is viewed in a state of being overlapped with a yellowish real image RL passing through the lens 14 in a range smaller than the range of the yellowish real image RL as shown in, for example, FIG. 6.

This structure makes it possible to achieve the following effects in this embodiment.

(1) If the corrective lens 14 that is used also as a sunglass lens is disposed closer to the eyeball than the transparent board 22 of the transmissive display device 13, there has been a possibility that a real image RL viewed through the lens 14 and a virtual image V displayed on the hologram element 34 of the transparent board 22 will have the systematically same hue because of transmission characteristics of the sunglass lens. However, in this embodiment, a virtual image V to be displayed on the hologram element 34 is displayed in green, and has a contrast differing from that of a yellowish real image RL that is viewed through the lens 14 and that is shown as a background, and therefore a difference between the two images can be easily distinguished. Especially, green belongs to a wavelength band easily perceived by the eyes, and therefore a distinction therebetween can be easily drawn.

(2) A virtual image V to be displayed on the hologram element 34 is displayed by projecting G light not by blocking R light and B light from image data obtained by photography, and therefore information given in the form of an image never deteriorates.

The present invention may be modified and embodied as follows.

Figure 7:
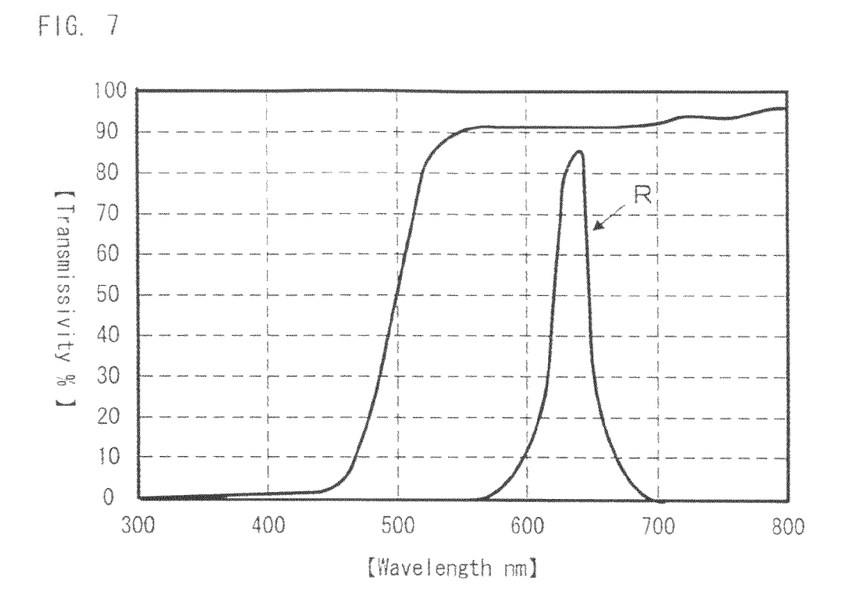
FIG. 7 is a graph showing transmission characteristics of the lens in a state of being overlapped with R light of the hologram element in another example.

As shown in FIG. 7, a virtual image V may be displayed by R light not by G light. Additionally, a virtual image V may be displayed by B light if transmission characteristics of the lens 14 are changed. Additionally, of course, no problems occur even if characteristics excluding those shown in FIG. 5 and FIG. 7 are adopted as transmission characteristics of the lens.

Figure 8:
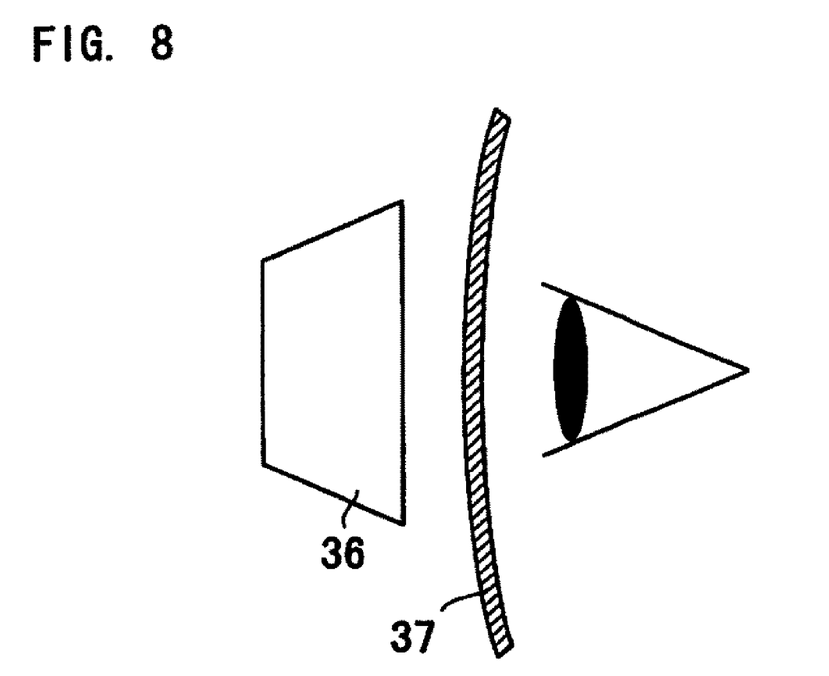
FIG. 8 is a schematic view of a display unit that uses a non-transmissive display device in another example.

In the above-mentioned embodiment, the transmissive display device 13 that adopts holography is shown as an example. However, the present invention can be, of course, applied to a transmissive display device or a non-transmissive display device that does not adopt holography. As shown in FIG. 8, a non-transmissive display device used herein does not include a transparent board 22 onto which a virtual image V is projected, and an image is projected onto a monitor 36, unlike the above-mentioned embodiment. In this example, it is recommended to dispose a sunglass lens 37 closer to the eyeball than the monitor 36. The reason is that, if the monitor 36 is closer to the eyeball than the sunglass lens 37, a distinction between a virtual image V and a real image can be fully recognized without displaying the virtual image V and the real image in mutually different contrasts as in the present invention.

In the above-mentioned embodiment, an image is projected by G light neither by R light nor by B light. However, R light and B light may be cut, or G light and B light may be cut. Additionally, R light and B light may be used so that the peak of each wavelength of these lights is modulated into G light in the control circuit 29.

The structure of the image projecting part 21 is one example, and may be formed to have another optical system differing from the above-mentioned one. Likewise, the structure of the camera 20 is one example, and may be formed to display a virtual image only by G light by using another means differing from the above-mentioned one.

The camera 20 is used as an example of a device for sending image data to the transmissive display device 13. However, the transmissive display device 13 may be connected to a computer, or to a DVD apparatus, or to a portable terminal device by wire or by wireless so as to output an image thereto.

The camera 20 is attached to the skeleton frame 12. However, this camera 20 may be set at a place except the skeleton frame 12. For example, it is conceivable to attach the camera 20 to the upper part of the transparent board 22.

The description specialized in the display unit 11 for visual assistance is given as above. However, without being limited to this, the invention can be embodied not for visual assistance, as follows.

For example, let it be supposed that work in a factory, such as stock control management in a warehouse, is performed. A worker can simultaneously perform stock control management while confirming information sent from a computer as a virtual image output from a transmissive display device. For example, information about a stock status in stock control management or information about an assembly manual in product assemblage can be conceived as information sent from the computer.

A case in which an operation, such as a surgical operation, is performed while confirming a manual or a simulation screen can be conceived when an inexperienced or knowledge-poor operator performs the operation.

It is conceivable to assist a hearing-impaired person by using software that converts sound information into character information. The use of the present invention brings about a great advantage because the sight of the hearing-impaired person cannot be obstructed.

Without being limited to the above-mentioned examples, the present invention can be freely carried out in an aspect not departing from the scope of the present invention.

The present examples and embodiments are to be considered as illustrative and not restrictive and the invention is not to be limited to the details given herein, but may be modified within the scope and equivalence of the appended claims.

The invention claimed is:

1. A display unit comprising:
an image data output device;
an image projecting device that visualizes image data output from the image data output device and then projects the image data so as to be perceived by eyes of a user;
a skeleton frame on which the image projecting device is mounted and that is set so that a nasal dorsum of the user and auricle bases of the user serve as parts that support the skeleton frame; and
sunglass lenses that have a predetermined transmission characteristic, the sunglass lenses being disposed directly or indirectly on the skeleton frame and being disposed in front of eyeballs of the user, respectively;
wherein the sunglass lenses are set so that a transmissivity of visible light in a predetermined wavelength region is peculiarly low and so that transmissivities of visible light in wavelength regions other than the visible light in the predetermined wavelength region are peculiarly high, and
wherein the coloring of image light visualized by the image projecting device is formed by light differing in color from the visible light having peculiarly high transmissivities in the sunglass lenses.

2. The display unit according to claim 1, wherein the image projecting device is a transmissive display device that has an image projection monitor displaying an image supplied from the image data output device on a transparent board, and wherein the sunglass lenses are disposed either before or behind the transparent board in a state of being overlapped with the transparent board.

3. The display unit according to claim 1, wherein the image projecting device is a non-transmissive display device that has an image projection monitor displaying an image supplied from the image data output device, and wherein the sunglass lenses are disposed behind the image projection monitor in a state of being overlapped with the image projection monitor.

4. The display unit according to claim 1, wherein the sunglass lens is used also as a corrective lens.

5. The display unit according to claim 1, wherein a hue of the image light is blue, or green, or red that differs from a hue of visible light passing through the sunglass lenses.

6. A display unit comprising:
an image pickup device;
an image projecting device that visualizes image data output from the image pickup device and then projects a visualized image onto eyes of a user so as to be perceived by the user;
a skeleton frame on which the image projecting device is mounted and that is set so that a nasal dorsum of the user and auricle bases of the user serve as parts that support the skeleton frame; and
sunglass lenses that have a predetermined transmission characteristic, the sunglass lenses being disposed directly or indirectly on the skeleton frame and being disposed in front of eyeballs of the user, respectively;
wherein the sunglass lenses are set so that a transmissivity of visible light in a predetermined wavelength region is peculiarly low and so that transmissivities of visible light in wavelength regions other than the visible light in the predetermined wavelength region are peculiarly high, and
wherein the coloring of image light visualized by the image projecting device is formed by light differing in color from the visible light having peculiarly high transmissivities in the sunglass lenses.

7. The display unit according to claim 6, wherein the image projecting device is a transmissive display device that has an image projection monitor displaying an image supplied from the image data output device on a transparent board, and wherein the sunglass lenses are disposed either before or behind the transparent board in a state of being overlapped with the transparent board.

8. The display unit according to claim 6, wherein the image projecting device is a non-transmissive display device that has an image projection monitor displaying an image supplied from the image data output device, and wherein the sunglass lenses are disposed behind the image projection monitor in a state of being overlapped with the image projection monitor.

9. The display unit according to claim 6, wherein the sunglass lens is used also as a corrective lens.

10. The display unit according to claim 6, wherein a hue of the image light is blue, or green, or red that differs from a hue of visible light passing through the sunglass lenses.

11. The display unit according to claim 6, wherein the image pickup device is attached to the skeleton frame.

12. The display unit according to claim 6, wherein the image light is obtained by projecting an image taken by the image pickup device while using light of any one of the three primary colors R, G, and B.

* * * * *